United States Patent [19]
Pilloff

[11] 3,904,984
[45] Sept. 9, 1975

BEST AVAILABLE COPY

[54] MODE-LOCKING SATURABLE ABSORBER FOR PRODUCING PICOSECOND AND SUB-PICOSECOND OPTICAL PULSES
[75] Inventor: Herschel S. Pilloff, Oxon Hill, Md.
[73] Assignee: The United States of America as represented by the Secretary of the Navy, Washington, D.C.
[22] Filed: Oct. 17, 1973
[21] Appl. No.: 407,365

[52] U.S. Cl. .............................. 331/94.5 M
[51] Int. Cl.² ............................. H01S 3/10
[58] Field of Search ........................ 331/94.5

[56] References Cited
UNITED STATES PATENTS
3,754,190   8/1973   Cross .................... 331/94.5 Q OTHER PUBLICATIONS
Snavely, Organic Dye Lasers: Headed Toward Maturity, Electro–Optical Systems Design (April 1973) pp. 30–36.
Snavely, Flashlamp–Excited Organic Dye Lasers, Proc. IEEE, Vol. 57, No. 8 (August 1969) pp. 1374–1390.

Primary Examiner—William L. Sikes
Attorney, Agent, or Firm—R. S. Sciascia; Arthur L. Branning; M. L. Crane

[57]     ABSTRACT
This invention provides an improved saturable absorber for mode-locking tunable, homogeneously broadened lasers operating in the spectral region between the infrared and the ultraviolet.

2 Claims, 2 Drawing Figures

MODE-LOCKING SATURABLE ABSORBER FOR PRODUCING PICOSECOND AND SUB-PICOSECOND OPTICAL PULSES

BACKGROUND OF THE INVENTION

This invention relates to laser systems and more particularly to an improved saturable absorber for mode-locking tunable, homogeneously broadened lasers.

Mode-locking saturable absorber laser systems have been set forth in the following articles. "Self-Mode-Locking of Dye-Lasers with Saturable Absorbers" by W. Schmidt and F. P. Schafer, *Physics Letters*, Vol. 26A, No. 11, pp 558–559, Apr. 22, 1968; and "Frequency-Tunable Transform-Limited Picosecond Dye Laser Pulses" by E. G. Arthurs, D. J. Bradley and A. G. Roddie, *Applied Physics Letters*, Vol. 19, No. 11, pp 480–482, Dec. 1, 1971. The described systems operate on transitions between the ground state and an excited singlet state. There are several disadvantages in using the technique. First, the ground state to excited singlet state absorption is not wavelength independent but contains considerable structural detail, the result is that the laser is more likely to burn through or bleach the absorber only in those regions of minimum absorption. As a consequence, it is unlikely that phase-locking of the modes can be obtained over a wide spectral range. Since the product of the spectral bandwidth and the pulse duration is a constant, for the case of transform-limited pulses, an increase in the spectral bandwidth (more modes) is required in order to obtain even shorter pulses. Second, while the thermalization of the vibrational levels in the excited electronic state is probably sufficiently fast for efficient homogeneous broadening, the relaxation or thermalization of vibrational levels in the ground electronic state is in many cases much slower. Because statistical processes determine the evolution of the mode-locking phenomena, at some point in time, one mode will have the highest field strength. As this first or most favored mode begins to saturate the absorber, the thermalization of the spectrally adjacent states (especially among the vibrational levels in the ground electronic state) may not be sufficiently fast in order to prevent this one mode from fully saturating the absorber before the other modes have reached threshold.

SUMMARY OF THE INVENTION

The mode-locking saturable absorber of this invention involves transition between excited electronic states such as triplet-triplet absorption. The system has a fast vibrational relaxation which is strongly coupled over many states so that the effect of the first mode is to contribute to bleaching-out a spectrally wide window. In this way many additional modes can be phase-locked with the result that shorter duration, higher peak power pulses will be obtained.

DESCRIPTION OF THE PREFERRED EMBODIMENT

Figure 1:
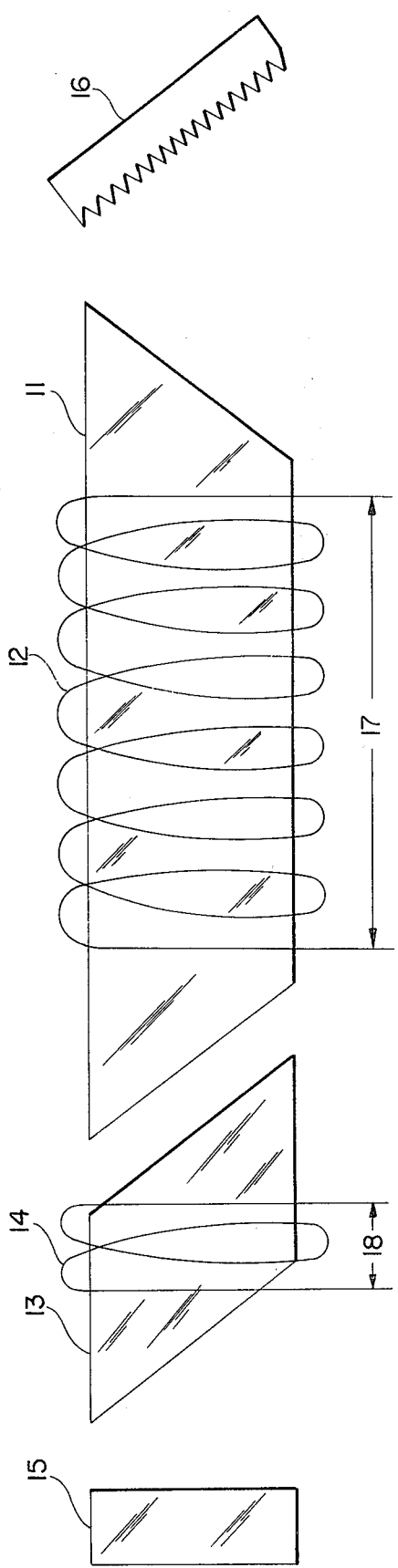
FIG. 1 illustrates a schematic of the laser system.

Now referring to the drawing, there is shown by illustration a schematic of a laser system made in accordance with the teaching of this invention. The system includes a dye cell 11 having an inner diameter of 10 mm and length of from 10–40 mm with the end windows at Brewster's angle through which the excited light passes. A 1000 Joule, 1 μsec. flash lamp 12 surrounds dye cell 11 for optical pumping of the laser element. A saturable absorber cell 13 having an inner diameter of 10 mm and length of about 10 mm with its ends at Brewster's angle is in optical alignment with dye cell 11. A 100 Joule, 1 μsec. flash lamp 14 surrounding the cell 13 optically pumps the saturable absorber solution in cell 13. A partially reflective output coupling mirror 15 is positioned adjacent the saturable absorber cell 13 in optical alignment therewith and a wavelength selector 16 is positioned opposite one end of the dye cell 11 in optical alignment therewith for selecting and reflecting a desired wavelength back through the system. Adjustment of the wavelength selector relative to the optical axis of the system enables a person to select a desired wavelength over the operable working parameters of the laser system. The flash lamps are fired by separate power sources 17 and 18.

The dye cell 11 illustrated has a 10 mm diameter, is from 10–40 mm long including therein a solution of an organic dye such as Rhodomine 6G, Fluorescein, 4-Methylumbelliferone solutes disolved in a solvent to produce dye laser under optical excitation with the dye solution circulating therethrough. The dye cell solution is pumped by a spiral type flash lamp excited by a 20–30 KV power source. The saturable absorber cell 13 has a diameter of 10 mm with a length of 10 mm with a solution of polyacene such as napthalene, anthracene and tetracene in an alcoholic solution circulating therethrough each of these produce triplet states upon optical excitation.

Figure 2:
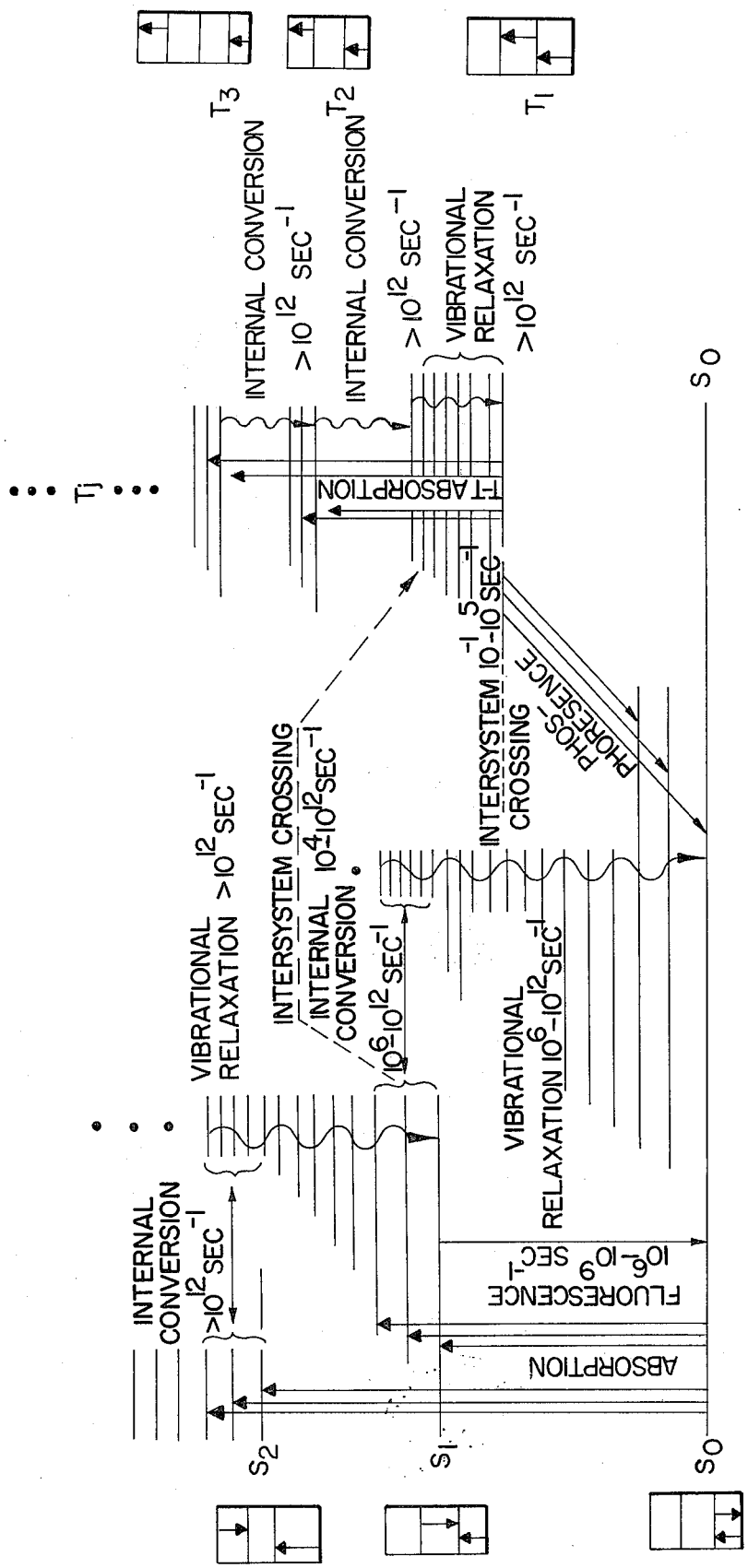
FIG. 2 illustrates an energy level diagram for the excited states.

The saturable absorber solution in cell 13 is selected such that, when the flash lamp 18 is fired, triplet states are produced by inner-system crossing from the singlet manifold and the triplet-triplet absorption strongly overlaps the spectral region in which the mode locked dye laser cavity operation is desired as shown in FIG. 2. As such, the saturable absorber has a fast vibrational relaxation which is strongly coupled over many states so that the effect of the first mode is to contribute to bleaching-out a spectrally wide window. In this way, many modes can be phase-locked resulting in the attainment of shorter duration, higher peak power pulses. In operation, the flash lamp for the dye cell 11 is delayed to fire on the order of 1 microsecond subsequent to the flash lamp of the saturable absorber. The delay is such that time is allowed for triplet build-up. The wavelength selector may be rotated on its axis in order to select a desired line of the output of the dye cell which oscillates back and forth as is well known in the laser art.

Obviously many modifications and variations of the present invention are possible in the light of the above teachings. It is therefore to be understood that within the scope of the appended claims the invention may be practiced otherwise than as specifically described.

What is claimed is:

1. A method of mode-locking an organic dye laser having a saturable absorber cell and a dye cell containing an organic dye solution positioned within the optical cavity of said laser so as to intersect its optical axis, for producing picosecond and sub-picosecond pulses, which method comprises:

optically pumping said organic dye solution in said saturable absorber cell to produce transitions between excited triplet states;

subsequent to optical pumping said organic dye solution in said saturable absorber, flash lamp pumping said dye solution in said dye cell and adjusting a wavelength selector in optical alignment with said dye cell to select a desired wavelength of operation.

2. A method as claimed in claim 1 wherein, the time between optically pumping said saturable absorber solution and said dye cell solution is 1 microsecond.

* * * * *